United States Patent [19]

Salisbury

[11] 4,426,348

[45] Jan. 17, 1984

[54] POLYURETHANE RIM SYSTEM

[75] Inventor: Wayne C. Salisbury, Middleton, N.H.

[73] Assignee: Ex-Cell-O Corporation, Troy, Mich.

[21] Appl. No.: 402,871

[22] Filed: Jul. 29, 1982

[51] Int. Cl.³ .......................... B29G 3/00; B29D 27/00
[52] U.S. Cl. .................................... 264/328.6; 264/53;
264/300; 264/328.8; 521/163; 521/176; 528/77
[58] Field of Search ................. 264/53, 300, DIG. 83,
264/328.6, 328.8; 521/163, 176; 528/77

[56] References Cited

U.S. PATENT DOCUMENTS

| | | | |
|---|---|---|---|
| 4,076,695 | 2/1978 | Keil | 264/DIG. 83 |
| 4,125,691 | 11/1978 | Waite | 264/DIG. 83 |
| 4,281,096 | 7/1981 | Nomura et al. | 264/DIG. 83 |
| 4,296,212 | 10/1981 | Ewen et al. | 521/163 |
| 4,301,110 | 11/1981 | Cuscurida et al. | 521/176 X |

Primary Examiner—Philip E. Anderson
Attorney, Agent, or Firm—Lee A. Strimbeck

[57] ABSTRACT

A polyurethane RIM system has at least two molding stations. The reactants are brought to the mixheads as three separate streams. One stream contains the isocyanate, the second stream contains some of the polyol, the chain extender and crosslinker and a third stream contains additional amounts of the polyol, along with what additives might be desired. At each mixhead the proportions of ingredients are controlled to give an isocyanate index of about 100, but the ratio of one polyol stream to the other is regulated to control the flex modulus and other properties of the molded product as may be desired. In this way, one source of supply can be used to feed several molding stations, each of wich may produce a product of different physical properties and thus of different costs.

5 Claims, 1 Drawing Figure

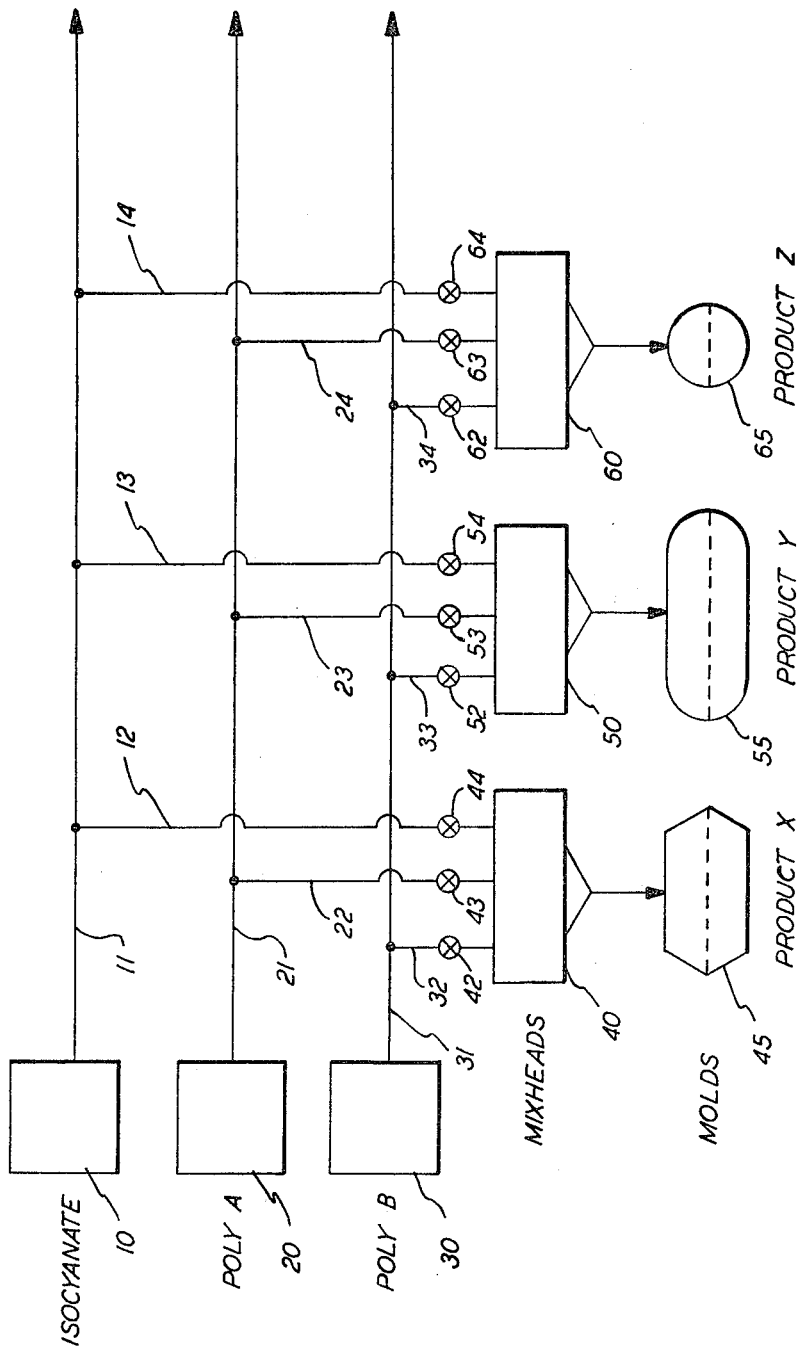

POLYURETHANE RIM SYSTEM

RELATED APPLICATION

This application relates to the subject matter of copending application "Polyurethane Molding Process with Siloxane Internal Release Agent", filed Mar. 20, 1981, Ser. No. 246,103, now U.S. Pat. No. 4,379,100 by one of the present inventors, the teachings of which and the prior art cited therein are incorporated herein by reference.

THIS INVENTION

This invention is a multi-station process for molding polyurethanes by reaction injection molding (hereinafter "RIM"). More particularly, this invention is a polyurethane molding system wherein the reaction ingredients are brought to a series of RIM mixheads from a common source as three separate streams and mixed independently in each mixhead in such proportions as may be desired to give molded products of different physical properties at each molding station. This permits the production from the same reactants of molded products of high physical properties and thus of higher cost simultaneously with the manufacture of products of lower physical properties and thus lower cost. The molding system offers considerable economy in that only a single source of supply need be used for each of the three reactant streams. This permits better control of the compositions and allows the economies of large scale batch preparation of each stream.

In brief compass, the present invention is a polyurethane RIM process having at least two molding stations consisting of a mixhead and mold cavity fed by the mixhead. The mold cavities are capable of rapid and repeated opening for demolding the product and closing to receive the next shot. The reactants include the customary long chain polyol, a chain extender, a crosslinker, the isocyanate and usually additives such as a mold release agent. The reactants are supplied to each mixhead from common sources as three streams. One stream is the isocyanate stream containing all of the isocyanate and free of any compound that would react with it, e.g. hydroxy and amino compounds. The second stream, here called the Poly A stream, contains the chain extender and crosslinker and some of the long chain polyol but is free of isocyanate which would react with these ingredients. The third stream, the Polyol B stream, is also free of the isocyanate and is usually free of any of the chain extender and crosslinker but contains the balance of polyol necessary to give a stoichiometric reaction with the isocyanate to an isocyanate index of 90 to 110. At each mixhead, the proportions of ingredients are controlled to give the desired isocyanate index, preferably of about 100. The ratios of the Polyol A to Polyol B streams are varied as desired to control the final physical properties of the molded product produced at each station. If a product of high physical properties and performance is desired, it may be produced, recognizing that generally it will be more expensive. Conversely, a product of lesser physical properties can be produced at another station at the same time at lower cost.

For example, the flex modulus of the molded product may be controlled by controlling the ratio of the Polyol A to the Polyol B stream. If more high molecular weight polyol is used, the flex modulus decreases and the product is less expensive. The higher the flex modulus used, generally speaking, the more expensive the product, and one does not want to give the customer a product any tougher than the customer requires and is willing to pay for. On the other hand, a higher flex modulus permits the use of thinner cross-sections for the same product and characteristics, such that a lesser weight of the polymer can be used, which would make the product less expensive. Thin cross-sections are harder to fill, however, and do present mold design problems. Consequently, the multi-station system proposed in this invention offers the product designer a great deal of flexibility, while offering the manufacturer the economies of preparing but three mixes or batches of the reactants, rather than a series of much smaller batches for each of the mixheads producing different products. The flexibility allowed by the concept of this invention regarding product design, costs and performance has not heretofore been appreciated in the RIM type of polyurethane molding process.

DRAWING

The drawing is a schematic illustration of the multi-station RIM polyurethane molding process of this invention.

DESCRIPTION

The following table gives an example of a three part polyurethane foaming composition which can be used in the practice of this invention, and gives the ranges of the various ingredients that may be used. The specific example shows the manufacture of three different products, X, Y and Z, having substantially different flex moduli by varying the ratio of Polyol A stream to that of the Polyol B stream. Product X, for example, could be a Ford Mustang fascia, Product Y could be a 1980 Chevrolet Corvette front fascia and Product Z could be a 1980 Chevrolet Corvette rear fascia.

TABLE I

| | Parts by Weight | | |
|---|---|---|---|
| | Broad Range | Preferred Range | Examples |
| Polyol A | | | |
| Long Chain Polyolol #1[1] | 20–50 | 30–40 | 29.66 |
| Long Chain Polyol #2[2] | 20–50 | 30–40 | 0 |
| Polymeric Diol[2] | 1–10 | 2–7 | 0 |
| Short Chain Alkane Diol #1[3] | 10–30 | 15–25 | 0 |
| Short Chain Alkane Diol #2[3] | 0.5–30 | 0.8–1.0 | 0 |
| Aromatic Polyamine #1[4] | 3–20 | 8–15 | 10.87 |
| Aromatic Polyamine #2[4] | 3–30 | 5–20 | 9.40 |
| Catalyst #1[5] | 0–6 | 3–5 | 0 |
| Catalyst #2[5] | 0.01–0.6 | 0.01–0.5 | 0.063 |
| Internal Release Agent[6] | 0.1–2.00 | 0.2–1.00 | (see below) |
| Blowing Agent[7] | 0–10 | 2–8 | 4.0 |
| Polyol B | | | |
| Long Chain Polyol #1[1] | 25–60 | 28–50 | 50 |
| Internal Release Agent[6] | 0.1–2.00 | 0.2–1.00 | 0.36 |
| Isocyanate | | | |
| MDI prepolymer[8] to Index of | 98–110 | 100–105 | 105 |

| | Example | | |
|---|---|---|---|
| | Product X | Product Y | Product Z |

TABLE I-continued

| Isocyanate Index | 1.05 | 1.05 | 1.05 |
|---|---|---|---|
| Polyol A/Polyol B ratio | 1.09 | 1.15 | 1.25 |
| Physical Properties: | | | |
| Tensile, psi, ASTM 412 | 2340 | 3150 | 3560 |
| Elongation, %, ASTM 412 | 300 | 350 | 380 |
| Tear, Die C, ASTM D624 | 443 | 490 | 540 |
| Flex modulus, psi, ASTM D790 | 27,200 | 34,500 | 38,300 |
| Heat sag, GM-CMPVS013AA | 0.36 | 0.24 | 0.08 |
| Specific gravity, ASTM D792 | 1.09 | 1.09 | 1.10 |

NOTES TO TABLE:
[1]A polyol having a molecular weight in the range of 3000-6000, a functionality of 2 to 3 and an equivalent weight of 1500-3000 such as polyetherdiol/triol polymer. Examples include Wyandotte's P-380, P-581, Carbide's 3128, 3428, D440; Jefferson's SF 5505.
1: E9207 supplied by Mobay
2: D440 supplied by Union Carbide
[2]A polytetramethylene glycol diol having a molecular weight od 500 to 2500. Polymeg 1000 supplied by Quaker Oats is used in these examples.
[3]These alkane diols preferably having molecular weights of 60-250. They are used as chain extenders.
1 is butane diol and #2 is ethylene glycol.
[4]Aromatic polyamine chain extenders/crosslinker such as methylene dianaline, toluene diamine, and phenylene diamine.
1: Curithane 103 (4,4'methylene dianiline) supplied by Upjohn
2: Baytec 505 supplied by Mobay
[5]Amine and organometallic catalysts such as triethylenediame, N—ethyl-morpholine, dibutyl tin diacetate and cobalt napthanate.
1: Dabco 33LU (Triethylene diamine) supplied by Air Products.
2: T-12 (dibutyl tin dilaurate) supplied by M & T Chemicals
[6]Internal release agent - A tricarboxyl functional dimethyl polysiloxane:
Me₃SiO(Me₂SiO)$_A$(MeSiO)$_B$SiMe₃

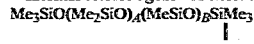

where:
A = 50 to 100 repeating SiO units
B = to give 1-3 mole percent
R = a carboxy functional radical of 2 to 10 carbon atoms
The examples use Q27119 supplied by Dow Corning:
Me₃SiO(Me₂SiO)₉₅(MeSiO)₃SiMe₃

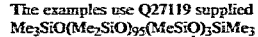

HOOCCH₂S(CH₂)₂

[7]DuPont's Freon-11, trichlorotrifluoroethane
[8]Pure MDI adduct or prepolymer such as Isonate 143L and 181 from Upjohn and Mondur PF and CD from Mobay. P96 from Mobay is the isocyanate used in the Example.

While the above example is a urea urethane system, the teachings of this invention are applicable to any urethane system that will accept the three stream approach whether it be polyester or polyether based, and whether extended with amines and/or alcohols.

The suppliers above referred to are more completely identified as follows:

| | |
|---|---|
| Wyandotte: | BASF Wyandotte Corporation |
| | Wyandotte, Michigan 48192 |
| Union Carbide: | Union Carbide Corporation |
| | Chemicals and Plastics |
| | South Charleston, W. Va. 25303 |
| Jefferson: | Jefferson Chemical Co., Inc. |
| | 260 Madison Avenue |
| | New York, New York |
| Upjohn: | Upjohn Company |
| | Industrial Chemicals Division |
| | North Haven, Conn. 06473 |
| Air Products: | Performance Chemicals |
| | Allentown, Pennsylvania |
| Dow: | Dow Chemical Company |
| | Freeport, Texas 77541 |
| GM: | General Motors Corporation |
| | 767 5th Avenue |
| | New York, New York 10153 |
| Ford: | Ford Motor Company |
| | The American Road |
| | Dearborn, Michigan 48121 |
| Chevrolet: | Chevrolet Motors |
| | 3007 Van Dyke Avenue |
| | Detroit, Michigan 48090 |
| Mobay: | Mobay Chemical Company |
| | Division of Baychem Corp. |
| | Pittsburgh, PA 15205 |
| Quaker Oats: | Quaker Oats |
| | Chemical Division |
| | Chicago, Illinois 60654 |
| M & T Chemicals: | M & T Chemicals, Inc. |
| | Subsidiary of American Can Company |
| | Rahway, New Jersey 07065 |
| Dow Corning: | Dow Corning Corporation |
| | Midland, Michigan |
| DuPont: | E. I. DuPont de Nemours Co. |
| | 1007 Market Street |
| | Wilmington, Delaware 19898 |

With reference to the drawing, illustrated is a three stream—three molding station polyurethane RIM process in accordance with the teachings of this invention, and following the example of the preceding table. The isocyanate stream, the MDI prepolymer, is prepared and stored at 10, the polyol stream is prepared and stored at 20 and the Polyol B stream is prepared and stored at 30. Each of these streams is conducted by manifolds 11, 21 and 31 to the feed lines to the various molding stations, only three of which are illustrated, which have mixheads 40, 50 and 60, respectively and mold cavities 45, 55 and 65, respectively, to produce the three products X, Y and Z.

For molding station 40, the Polyol B stream is introduced from line 31 by line 32 through control valve 42, and the Polyol A stream is introduced from line 21 by line 22 through control valve 43 in the proportion desired, in the case of Product X a ratio of Polyol A to Polyol B of 1.09. Sufficient isocyanate from manifold 11 is added via line 12 and control valve 44 to give an isocyanate index of 1.05.

Similarly, Polyol B is supplied to mixhead 50 via line 33 and control valve 52 and Polyol A is supplied by line 23 and control valve 53 to give, in the case of Product Y, a Polyol A to Polyol B ratio of 1.15. Isocyanate is added by line 13 and control valve 54 to give an isocyanate index of 1.05.

In mixhead 60 the Polyol B stream is supplied by line 34 through valve 62 and the Polyol A stream through line 24 via control valve 63 to give for Product Z a ratio of Polyol A to Polyol B of 1.25. The isocyanate is added by line 14 through control valve 64 to give an isocyanate index of 1.05.

The reaction injection molding process proceeds quite rapidly, particularly so in the present case as a large amount of aromatic polyamine is present. Usually with this type of RIM process, injection or mold filling is completed in less than 5 seconds, and the product is demolded in less than a minute thereafter. In the three cases of the example the times from the initial mixing of the three ingredients in the mixheads to complete filling of the mold in each cycle is less than 1.2 seconds. Cure times are quite rapid, and in all three cases the products are demolded from the molds within 40 seconds from the time of completion of injection into the molds.

What is claimed is:

1. A polyurethane molding process having at least two molding stations of a mixhead and a mold cavity fed thereby, said mold cavity being capable of repeated openings and closings, wherein the ingredients for a polyurethane forming composition are brought together in each said mixhead and rapidly injected into the mold cavity associated therewith to form a molded article, said ingredients including a long chain polyol, a chain extender, a crosslinker and an isocyanate; comprising:

(a) supplying each of said molding stations with said ingredients in at least three streams from a single source for each stream as follows:
   (i) an isocyanate stream containing all of said isocyanate and free of reactive hydroxy and amino compounds,
   (ii) a Polyol A stream free of said isocyanate and containing said chain extender and crosslinker, and some of said long chain polyol, and
   (iii) a Polyol b stream containing said long chain polyol and free of said isocyanate, said chain extender and said crosslinker,
(b) controlling said ingredients supplied to one of said molding stations to have a relatively high ratio of said Polyol A stream to said Polyol B stream and to yield a molded product having a relatively low flex modulus;
(c) controlling said ingredients supplied to one other of said molding stations to have a relatively lower ratio of Polyol A stream and to yield a molded product having a relatively higher flex modulus, and
(d) allowing the ingredients injected into the mold cavities in steps (b) and (c) to go to completion and demolding the products.

2. The process of claim 1 wherein said molding stations are reaction injection molding stations with the time from mixing said ingredients in the mixhead to the time of completion of injection into the mold cavities being less than five seconds.

3. The process of claim 1 wherein said ingredients are mixed in such ratios at each of said molding stations as to give an Isocyanate Index in the range of 90 to 110.

4. The process of claim 1 wherein said Polyol B stream contains additives including a siloxane internal mold release agent not contained in said isocyanate stream or said Polyol B stream.

5. The process of claim 1 wherein said Polyol A stream contains a chain extender selected from the group of butane diol and ethylene glyol, wherein said extender/crosslinker is an aromatic polyamine, and wherein said isocyanate is a methylene di-isocyanate.

* * * * *